United States Patent
Mikkelsen et al.

(10) Patent No.: US 10,633,913 B2
(45) Date of Patent: Apr. 28, 2020

(54) VACUUM INSULATED GLAZING UNIT

(71) Applicant: VKR Holding A/S, Hørsholm (DK)

(72) Inventors: Thomas Villiam Sejer Mikkelsen, Hørning (DK); Peter Sønderkær, Horsens (DK); Annette Johncock Krisko, Prarie du Sac, WI (US)

(73) Assignee: VKR HOLDING A/S, Hørsholm (DK)

( * ) Notice: Subject to any disclaimer, the term of this patent is extended or adjusted under 35 U.S.C. 154(b) by 0 days.

(21) Appl. No.: 15/899,830

(22) Filed: Feb. 20, 2018

(65) Prior Publication Data

US 2018/0238104 A1 Aug. 23, 2018

(30) Foreign Application Priority Data

Feb. 17, 2017 (DK) .................................. 2017 70111
Feb. 13, 2018 (EP) .................................... 18156478

(51) Int. Cl.
*E06B 3/66* (2006.01)
*E06B 3/673* (2006.01)
*E06B 3/677* (2006.01)

(52) U.S. Cl.
CPC .......... *E06B 3/6612* (2013.01); *E06B 3/6736* (2013.01); *E06B 3/6775* (2013.01);
(Continued)

(58) Field of Classification Search
CPC .. E06B 3/6612; E06B 3/67334; E06B 3/6736; E06B 3/6775
See application file for complete search history.

(56) References Cited

U.S. PATENT DOCUMENTS 5,855,638 A    1/1999  Demars
6,676,786 B1 * 1/2004  Collins ................. E06B 3/6612
                                                       156/104

(Continued)

FOREIGN PATENT DOCUMENTS

CN      1424482 A    6/2003
JP      11240739     9/1999
(Continued)

OTHER PUBLICATIONS

JP 2000195426 machine translation, Sealing method and closed housing and image display device and evacuation device, Koyama, Jul. 14, 2000 (Year: 2000).*

(Continued)

*Primary Examiner* — Queenie S Dehghan
(74) *Attorney, Agent, or Firm* — Cantor Colburn LLP (57) ABSTRACT

An arrangement for producing vacuum insulated glazing (VIG) unit and an evacuation cup suitable for such use as well as a method therefore is presented so as to provide a more uniform or homogeneous heating of the part of the glass pane containing the evacuation hole and possibly a soldering material arranged around the evacuation hole, in particular for the reason of preventing larger temperature gradients in the glass pane between the part covered by the evacuation cup and the remaining part and for avoiding excessive locale temperatures of the glass pane under the evacuation cup, which may be harmful the durability of the glass pane, in particular when the glass pane is made from tempered glass, where the tempering of the glass may be influenced by excessive temperatures.

10 Claims, 6 Drawing Sheets

(52) U.S. Cl.
CPC ........... *E06B 3/67334* (2013.01); *Y02A 30/25* (2018.01); *Y02B 80/24* (2013.01)

(56) References Cited

U.S. PATENT DOCUMENTS

| | | | |
|---|---|---|---|
| 2009/0151854 A1* | 6/2009 | Cooper | C03C 8/24 |
| | | | 156/109 |
| 2009/0155500 A1* | 6/2009 | Cooper | E06B 3/6612 |
| | | | 428/34 |
| 2015/0047394 A1 | 2/2015 | Tang | |
| 2015/0068666 A1* | 3/2015 | Abe | C03C 27/06 |
| | | | 156/109 |
| 2018/0238106 A1* | 8/2018 | Sonderk R | E06B 3/677 |
| 2019/0003243 A1* | 1/2019 | Sonderk R | C03C 27/06 |
| 2019/0368264 A1* | 12/2019 | Sonderk R | E06B 3/6775 |

FOREIGN PATENT DOCUMENTS

| | | |
|---|---|---|
| JP | 2000195426 A | 7/2000 |
| JP | 2004265775 A | 9/2004 |
| WO | 0029703 A1 | 5/2000 |

OTHER PUBLICATIONS

Danish Search Report for corresponding application PA 2017 70111; Report dated Aug. 15, 2017.
European Search Report for corresponding application EP18156478; Report dated Jun. 14, 2018.

* cited by examiner

VACUUM INSULATED GLAZING UNIT

CROSS REFERENCE TO RELATED APPLICATION

This application is related to and claims the benefit of Denmark Patent Application Number PA201770111 filed on 17 Feb. 2017 and of European Patent Application Number 18156478.2 filed on Feb. 13, 2018, the contents of both of which said applications are incorporated herein by reference in their entirety.

TECHNICAL FIELD

The present disclosure relates to an arrangement for producing vacuum insulated glazing (VIG) unit and an evacuation cup suitable for such use as well as a method therefore.

BACKGROUND

When producing vacuum insulated glazing (VIG) units it is known from the art to provide an evacuation cup to enclose an evacuation opening or hole in one of the glass panes constituting the VIG unit in order to evacuate the interior void of the VIG unit so as to create a vacuum with an insulating effect between the glass panes of the VIG unit. It is known in the art to apply heating to the interior of the evacuation cup in order to seal off the evacuation hole after evacuating the interior void of the VIG unit.

In WO 00/29703 it is disclosed to situate a glass tube in the evacuation hole and provide a seal between the tube and the edge of the evacuation hole by means of a soldering material which is softened in a general heating of the VIG unit to provide a gas tight seal around the tube. Afterwards, an evacuation cup is placed over the tube and the void is evacuated. A metal coil inside the evacuation cup and enclosing the tip of the glass tube is electrically heated to melt the tip of the tube and thereby provide a sealing of the void.

Another evacuation cup and the use thereof for evacuating a VIG unit is disclosed in U.S. Pat. No. 5,855,638, wherein a heating coil situated external to the evacuation cup at one side thereof is applied to heat the cup after evacuation of the void of the VIG unit so as to soften a ball of a soldering material situated at the top of the evacuation hole so that it will plug the countersunk outer opening of the evacuation hole.

An evacuation cup for evacuating of a VIG unit is disclosed in US 2015/047394, wherein a heating element is arranged movably inside the evacuation cup so that a sealing sheet can be fixed to the glass pane of the VIG unit by means of heating a solder material between the sealing sheet and the glass pane and thus sealing off the evacuation hole.

BRIEF DESCRIPTION

The present inventors have found that it is advantageous to provide a more uniform or homogeneous heating of the part of the glass pane containing the evacuation hole and possibly a soldering material arranged around the evacuation hole, in particular for the reason of preventing larger temperature gradients in the glass pane between the part covered by the evacuation cup and the remaining part and for avoiding excessive locale temperatures of the glass pane under the evacuation cup, which may be harmful the durability of the glass pane, in particular when the glass pane is made from tempered glass, where the tempering of the glass may be influenced by excessive temperatures. The use of evacuation cups with heating sources distributed along the perimeter of the inner cavity of the evacuation cup has turned out to be advantageous for these reasons and have further advantages, which will be apparent from the following.

In a first aspect, the present disclosure relates to an evacuation cup for providing a vacuum to a vacuum insulated glazing (VIG) unit comprising two glass panes which delimit a void therebetween, wherein one of the glass panes includes an evacuation hole therethrough, the evacuation cup comprising a housing wall, a first cavity within the housing wall arranged to be in fluid communication with the evacuation hole of the VIG unit by a first opening of the first cavity, a first plane land enclosing the first opening, a first conduit extending through the housing wall and disposed in fluid communication with the first cavity, and a first heating arrangement placed outside of the first cavity of the evacuation cup, the first heating arrangement configured to heat the housing wall distributedly along a perimeter of the first cavity.

With the term "arranged distributedly" is herein understood that the heat source of the first heating arrangement is not a single point source of heat, such as a single electrical resistance heater placed inside the housing wall of the evacuation cup at one point, but comprises one or more heat sources distributed along the perimeter of the first cavity, so that a more uniform or homogeneous heating is sought to be achieved. A heating arrangement can be said to be arranged distributedly if any plane being perpendicular to the plane of the first opening of the first cavity and containing a centreline of the evacuation cup would split the cup in two parts each being heated by the heating arrangement.

Such first heating arrangement can preferably be arranged to heat the housing wall at positions distributed substantially evenly along the perimeter of the first cavity. The first heating arrangement may in one example comprise at least two electrical heating elements extending substantially perpendicularly to the plane of the first opening, preferably at least three such heating elements and such as four heating elements.

In another example, the first heating arrangement comprises at least one ring-shaped electrical heating element enclosing the first cavity. The ring-shaped electrical heating element extends in a preferred example substantially parallel to the plane of the first opening.

By arranging the first heating arrangement to heat the housing wall distributedly along the perimeter of the first cavity there may obtained an infrared heating of a soldering material, such as a soldering material containing a low-temperature melting glass frit, surrounding the evacuation hole, which heating is substantially homogeneous about an axis extending outward from the evacuation hole. Such heating of a soldering material may be performed prior to the actual evacuation of the void of the VIG unit for reaching a vacuum in order to form a gas tight seal around an evacuation tube extending from the evacuation hole or after the evacuation to reach a vacuum in the void so as to seal off the evacuation hole by means of a soldering material. In both cases, it is advantageous to provide a homogeneous heating from the inside of the housing wall to the soldering material so that an excessive heating of a part of the soldering material and/or a part of the first glass pane of the VIG unit under the evacuation cup due to uneven heating is prevented.

The plane first land defines the edge of the housing wall that in contact with the outer surface of the first glass pane of the VIG unit, either directly or with a seal or gasket in between, will form a substantially hermetic connection that will allow a vacuum to be created in the void of the VIG unit by evacuating the first cavity of the evacuation cup.

The evacuation cup may further comprise a control arrangement configured to control the operation of the first heating arrangement, in particular so as to heat the housing wall of the evacuation cup to a second temperature by means of the first heating arrangement, the second temperature being at least 5° C., preferably at least 8° C. higher, such as at least 12° C. higher, than the temperature external to the evacuation cup, i.e. of the air surrounding the outside of the evacuation cup, i.e. the temperature of the air inside e.g. a furnace the arrangement is situated within. Hereby, the first heating arrangement may compensate for the temporal lacking of the temperature inside the evacuation cup and thus of the part of the first glass pane covered by the evacuation cup with respect to the air temperature of a furnace which the arrangement is situated within during preparation of the VIG unit. Such control of the second temperature being higher than the first temperature may in particular be employed during softening of a soldering material surrounding an evacuation tube extending from the evacuation hole to a flowing state in order to form an air tight seal.

The heating element(s) of the first heating arrangement is/are in a preferred example situated at least partly inside the housing wall, such as completely inside the housing wall. However, in other examples of the present disclosure, the first heating arrangement may be situated on the evacuation cup but outside of the housing wall and heat said wall from the outside by means of e.g. conduction heating between the two and/or infrared heating, or the first heating arrangement may comprise other means for radiation heating, such as microwave heating or laser light sources. In a further example according to the present disclosure, such means of radiation heating of the first heating arrangement may not be connected physically to the evacuation cup but instead be arranged externally in e.g. a furnace.

The first opening if the first cavity is preferably substantially circular in shape, so that the first plane land encloses a substantially circular first opening.

Each evacuation cup may in a particular preferred example further comprise a second plane land enclosing the first plane land and defining a second cavity within the housing wall with a second opening situated between the first plane land and the second plane land, and a second conduit connecting the second cavity and the outside of the housing wall. During operation of the evacuation cup, an evacuation pump is connected to the second conduit so as to lower the pressure inside the second cavity, which reduces the possible leakage from the exterior into the first cavity of the evacuation cup during evacuation of the void. Hereby, the hermetic connection between the first glass pane and the evacuation cup is improved. It is furthermore preferred that the first plane land and the second plane land are of concentric annular shape.

The largest width of the evacuation cups in the plane of the first plane land is 50 millimetres or less, preferably 45 millimetres or less.

In yet a preferred example, the evacuation cup further comprises a second heating arrangement to heat a distal tip of a tube extending from the evacuation hole so as to seal it off. The tube, typically made from glass, is melted at the distal tip by means of the second heating arrangement after evacuation of the void of the VIG unit so as to seal it off and maintain the vacuum inside the void.

The second heating arrangement comprises preferably a second heating element placed inside the first cavity of the evacuation cup, such as a ceramic heating element, preferably a silicon nitride and/or aluminium nitride ceramic heater or alternatively a heating coil made from tungsten.

The control arrangement may furthermore is arranged to control the operation of the second heating arrangement.

The evacuation cup may furthermore comprise at least one temperature sensor arranged in the evacuation cup for measuring a temperature and providing an output accordingly to the control arrangement. The sensor or sensors may be arranged to measuring the temperature of the housing wall, of the air inside the cavity of the evacuation cup or of the first pane of the VIG unit.

In a second aspect of the present disclosure, it relates to an arrangement for providing a vacuum to vacuum insulated glazing (VIG) units each comprising a void enclosed between two glass panes, wherein an evacuation hole is provided through one of the glass panes, the arrangement comprising an evacuation cup for each VIG unit, each evacuation cup comprising a housing wall, a first cavity within the housing wall arranged to be in fluid communication with the evacuation hole of the VIG unit by means of a first opening of the first cavity, a first plane land enclosing the first opening, a first conduit through the housing wall and in fluid communication with the first cavity, the arrangement further comprising for each evacuation cup a separate first heating arrangement placed outside of the first cavity of the evacuation cup, the first heating arrangement being arranged for heating the housing wall distributedly along the perimeter of the first cavity.

The arrangement according to the second aspect of the present disclosure may comprise the features discussed previously with respect to the evacuation cup according to the first aspect of the present disclosure.

In a third aspect of the present disclosure, it relates to a method for providing a vacuum to a vacuum insulated glazing (VIG) unit comprising two glass panes which delimit a void therebetween, wherein one of the glass panes includes an evacuation hole therethrough, the method comprising:

arranging an evacuation cup on a first glass pane so that the evacuation hole is in fluid communication with a first cavity provided in a housing wall of the evacuation cup by a first opening of the first cavity, placing the VIG unit in a furnace, heating air of an interior of the furnace with the VIG unit to a first temperature, heating the housing wall of the evacuation cup to a second temperature by a first heating arrangement placed outside the first cavity of the evacuation cup while the air temperature of the furnace is at said first temperature, the second temperature being at least 5° C. higher than the first temperature, and evacuating the void by pumping out the first cavity of the evacuation cup through a first conduit provided through the housing wall and in fluid communication with the first cavity.

Hereby, the first heating arrangement may compensate for the temporal lacking of the temperature inside the evacuation cup and thus of the part of the first glass pane covered by the evacuation cup with respect to the air temperature of a furnace which the arrangement is situated within during preparation of the VIG unit. Such control of the second temperature being higher than the first temperature may in particular be employed during softening of a soldering material surrounding an evacuation tube extending from the evacuation hole to a flowing state in order to form an air tight seal.

The method may also comprising the heating of the housing wall of the evacuation cup prior to the temperature of the air inside the furnace reaching its goal temperature, i.e. the first temperature.

The method may further comprise the step of maintaining the air temperature of the furnace at said first temperature while the housing wall is maintained at said second temperature for at least for 5 minutes, preferably at least for 10 minutes, so as to heat a soldering material surrounding the evacuation hole.

The soldering material is preferably heated to a condition where it flows so that an air tight seal is formed. The formation of the seal may be conducted prior to the evacuation of the void to a vacuum, in which case a tube is provided extending from the evacuation opening and the seal is formed between the outer surface of the tube and the outer surface of the first glass pane so that the only gas passage between the void and the first cavity of the evacuation cup is through the tube. Alternatively, the soldering material is heated after the evacuation of the void is conducted so as to seal off the evacuation hole.

The evacuation of the void is preferably carried out when the soldering material surrounding the evacuation hole is in a non-flowing condition.

The soldering material may in specific examples be heated to a higher temperature than necessary to reach the flowing condition of the soldering material so as to perform a heat treatment of the soldering material, such as a partial crystallization of the soldering material. The temperature may e.g. be temperature 20-50° C. higher than the temperature to reach the flowing condition, where the soldering material will flow out and bond with the surface of the first pane. The temperature of the soldering material will in such case typically be in the range of 400 to 440° C.

The soldering material comprises preferably a low-melting temperature glass solder frit, more preferred a lead-free glass solder frit.

In a particular example of the method, the housing wall of the evacuation cup is heated so that the temperature of the first glass pane covered by the first cavity of the evacuation cup is substantially the same as the temperature of the first glass pane that is not covered by the evacuation cup, i.e. preferably with a deviation between the temperatures within 5° C., preferably within 3° C. This step is preferably performed when the air temperature of the furnace has reached T1.

The method may further comprise the step of heating a distal tip of a tube extending from the evacuation hole by means of a second heating arrangement so as to seal the distal tip off.

The method according to the third aspect of the present disclosure may be carried out with an arrangement and/or an evacuation cup as discussed previously with respect to the first aspect and the second aspect of the present disclosure.

According to a fourth aspect of the present disclosure, it relates to an evacuation cup for providing a vacuum to a vacuum insulated glazing (VIG) unit comprising a void enclosed between two glass panes, wherein an evacuation hole is provided through one of the glass panes, the evacuation cup comprising a housing wall, a first cavity within the housing wall arranged to be in fluid communication with the evacuation hole of the VIG unit by means of a first opening of the first cavity, a first plane land enclosing the first opening, a first conduit through the housing wall and in fluid communication with the first cavity, a first heating arrangement comprising electrical heating element or elements being arranged inside the first cavity of the evacuation cup and distributedly along the perimeter of the first cavity, and a second heating arrangement placed inside the first cavity for heating a distal tip of a tube extending from the evacuation hole so as to seal it off.

By arranging the first heating element inside the first cavity of the evacuation cup distributedly along the perimeter of the first cavity to provide a more uniform or homogeneous heating of the part of the glass pane containing the evacuation hole and possibly a soldering material arranged around the evacuation hole may be achieved as previously discussed.

The heating element or elements of the first heating arrangement is/are a ceramic heating element, preferably a silicon nitride and/or aluminium nitride ceramic heater. However, e.g. tungsten may also be used as material for the heating element or elements.

The evacuation cup according to the fourth aspect of the present disclosure may further comprising a control arrangement for controlling the operation of the first heating arrangement so as to heat the air in the first cavity of the evacuation cup by means of the first heating arrangement to the temperature of the air surrounding the outside of the evacuation cup. The deviation between the temperatures is preferably within 5° C., more preferably within 3° C.

The first heating arrangement is preferably distributed substantially evenly along the perimeter of the first cavity.

The first heating arrangement may in one example of the present disclosure comprise at least two electrical heating elements extending substantially perpendicularly to the plane of the first opening, preferably at least three such heating elements, such as four such heating elements.

According to another example of the evacuation cup of the fourth aspect, the first heating arrangement comprises at least one ring-shaped electrical heating element enclosing the first cavity. The ring-shaped electrical heating element extends preferably substantially parallel to the plane of the first opening.

In a fifth aspect of the present disclosure, it relates to a method for providing a vacuum to a vacuum insulated glazing (VIG) unit comprising a void enclosed between two glass panes, wherein an evacuation hole is provided through a first of the glass panes, the method comprising the steps of
- arranging an evacuation cup on the first glass pane so that the evacuation hole is in fluid communication with a first cavity provided in a housing wall of the evacuation cup by means of a first opening of the first cavity,
- placing the VIG unit in a furnace,
- heating the air of the interior of the furnace with the VIG unit to a first temperature,
- heating the first cavity of the evacuation cup by means of a first heating arrangement comprising electrical heating element or elements being arranged inside the first cavity of the evacuation cup and distributedly along the perimeter of the first cavity,
- evacuating the void by pumping out the first cavity of the evacuation cup through a first conduit provided through the housing wall and in fluid communication with the first cavity, and
- heating a distal tip of a tube extending from the evacuation hole by means of a second heating arrangement so as to seal it off.

The first cavity of the evacuation cup is preferably heated by means of the first heating arrangement so that a soldering material surrounding the evacuation hole is heated to a condition where it flows.

The soldering material may in a preferred example of the method according to the fifth aspect of the present disclosure be heated after the evacuation of the void is conducted so as to seal off the evacuation hole.

It is furthermore preferred that said evacuation of the void is carried out when the soldering material surrounding the evacuation hole is in a non-flowing condition.

The soldering material may furthermore be heated to a higher temperature than to reach the flowing condition of the soldering material so as to perform a heat treatment of the soldering material, such as to a temperature 20-50° C. higher than the temperature to reach the flowing condition, where the soldering material will flow out and bond with the surface of the first pane. The temperature of the soldering material will typically be in the range of 400 to 440° C.

Said soldering material comprises preferably a low-melting temperature glass solder frit, in particular a lead-free glass solder frit.

The first cavity of the evacuation cup is preferably heated so that the temperature of the first glass pane covered by the first cavity of the evacuation cup reaches substantially the same temperature as the temperature of the first glass pane that is not covered by the evacuation cup, the deviation between the temperatures is preferably within 5° C., more preferably within 3° C.

According to another example of the method according to the fifth aspect of the present disclosure, the air of the interior of the furnace is heated according to a predefined profile of temperature and the first heating arrangement is operated to heat the first cavity of the evacuation cup so that the temperature of the air in the first cavity is substantially the same as the temperature (T1) of the air of the interior of the furnace, the deviation between the temperatures being preferably within 5° C., more preferably within 3° C.

The second heating arrangement is preferably placed inside the first cavity, but may alternatively be placed externally to the evacuation cup and operate by means of e.g. microwave radiation or laser light.

The second heating arrangement when arranged inside the first cavity may comprise a second heating element which is a ceramic heating element, preferably a silicon nitride and/or aluminium nitride ceramic heater. Alternatively, the second heating arrangement may comprise a heating coil of e.g. tungsten.

The method of the fifth aspect of the present disclosure may be using the evacuation cup according to the fourth aspect of the present disclosure.

FIGURES

Aspects of the present disclosure will be described in the following with reference to the figures in which.

DETAILED DESCRIPTION

The present disclosure relates to an arrangement for providing a vacuum to vacuum insulated glazing (VIG) units 1. As shown in FIG. 1-4 each VIG unit 1 comprises a void 3 enclosed between two glass panes 2a, 2b and an evacuation hole 4 is provided through one of the glass panes 2a. A number of pillars 5 may be arranged between the glass panes 2a, 2b in order to maintain the separation of the glass panes 2a, 2b at a suitable distance providing optimum insulating effects, such as about 0.2 millimetres. A side seal 6 is arranged peripherally between the two glass panes 2a, 2b and enclosing the void 3 and a soldering frit material 7 is placed around the evacuation hole 4.

FIG. 1-4 shows cross-sections of an arrangement according to examples of the disclosure. The arrangement is placed in connection with a VIG unit 1 and the arrangement comprises an evacuation cup 8 comprising a housing wall 8' and a first cavity 9a within the housing wall 8' arranged to be in fluid communication with the evacuation hole 4 of the VIG unit 1 by means of a first opening 10a. The evacuation cup 8 further comprises a first plane land 11a enclosing the first opening 10a, and a first conduit 12a through the housing wall 8' and in fluid communication with the first cavity 9a. The arrangement also comprises for each evacuation cup 8a separate first heating arrangement 13 placed outside of the first cavity 9a of the evacuation cup 8 and the first heating arrangement 13 is being arranged for heating the housing wall 8' distributedly along the perimeter of the first cavity 9a. As result of the special configuration of the first heating arrangement 13, such as surrounding the first cavity 9a with heat element(s) distributed evenly, a soldering frit material 7 placed around the evacuation hole 4, may be heated substantially uniformly by means of the first heating arrangement 13 via a substantially uniform heating of the housing wall 8'. The heating element(s) may be distributed symmetrically such that the axis of symmetry is an axis extending outward from the evacuation hole 4, and preferably perpendicular to the first opening 10a and/or the first plane land 11a. Additionally or alternatively the heating element(s) may be arranged symmetrically having one or more axis of symmetry in a plane parallel to first opening 10a and/or the first plane land 11a.

As the housing wall 8' is heated it will transfer heat towards the soldering frit material 7 and the first glass pane 2a covered by the evacuation cup 8. The thermal energy can be transferred by conduction, convection or radiation. Heat transfer by convection will be predominant when the first heating arrangement 13 is operated to heat the housing wall 8' prior to evacuation of the void 3 by heating up the air inside the first cavity 9a. Heat transfer by means of radiation will also occur as the hot housing wall 8' will become a source of radiation for irradiating the soldering frit material 7 preferably evenly from all sides of the evacuation cup 8 in a plane perpendicular to the first plane land 11a. This will in turn provide a dense and uniform frit seal. The first heating arrangement 13 may comprise a single or several heating elements, and the heating elements may be chosen from a group of different types such as IR radiation, microwave or laser radiation, induction, electrical and ceramic heaters. The housing wall 8' is made of metal durable at high temperatures and a good conductor of heat for the present disclosure, such as stainless steel.

In the present examples, the evacuation cup 8 is of circular shape in a cross-section in a plane parallel to the glass panes 2a, 2b and enclosing an evacuation hole 4, which preferably is also of a circular shape. In one or more aspects, the diameter of the evacuation cup 8 measured parallel to the first plane land 11a is preferably no larger than 50 mm, such as 45 mm and provides a temperature change in a small region of the VIG unit 1, minimizing any possible reduction in overall strength of the glazing unit due to a temperature difference between first cavity 9a and the outside of the evacuation cup 8.

As shown in the present examples, the soldering frit material 7 may comprise an evacuation opening for evacuating the void 3 of the VIG unit 1 through the first conduit 12a via the first cavity 9a and the evacuation opening.

Alternatively, the soldering frit material 7 surrounds a glass tube 14 which provides a pathway for the gas between the void 3 and the first cavity 9a. After evacuation of the void 3 the evacuation hole 4 is closed. In one or more examples, the first heating arrangement 13 is configured to be operated to provide the necessary heat for the soldering frit material 7 to enter a flowing state and close off the evacuation hole 4 at pressures from atmospheric to vacuum pressures.

A temperature sensor 15 is placed in the housing wall 8' as indicated in FIG. 1-4. This sensor 15 measures the temperature of the housing wall 8' and is configured to send an output accordingly to a control arrangement 16 and/or the user of the system, which controls the temperature of the housing wall 8' based on the output by controlling the operation of the first heating arrangement 13. The sensor output may be used as an indirect measure of the temperature of the air inside the first cavity 9a and of the soldering frit material 7. Furthermore, the first heating arrangement 13 may be controlled through a proportional-integral-derivative (PID) controller system comprised in the control arrangement 16. In alternative examples, the evacuation cup 8 may be provided with one or more temperature sensors for measuring the temperature of the air inside the first cavity 9a and/or the outer surface temperature of the first glass pane 2a inside the first cavity 9a and provide output accordingly to the control arrangement 16.

Figure 1A:
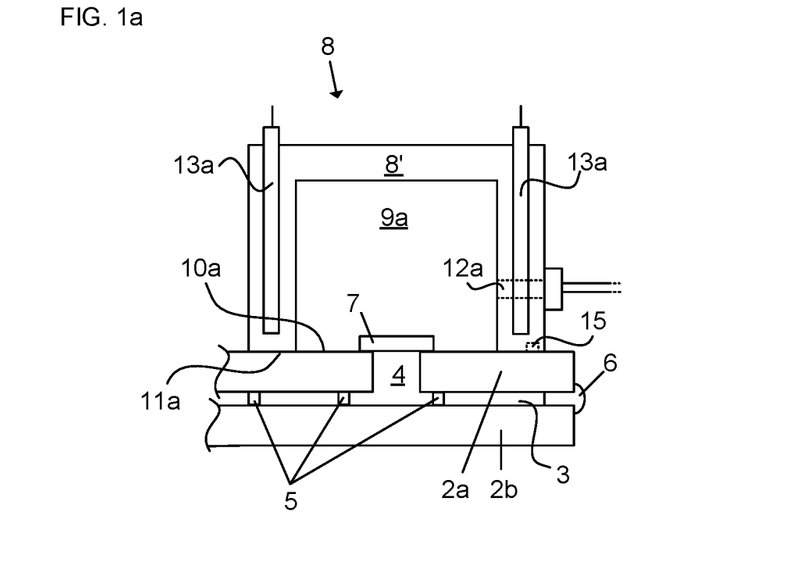
FIG. 1a shows a cross-sectional view of an evacuation cup placed on a part of a VIG unit where the evacuation cup comprises a first heating arrangement situated inside the housing wall of the evacuation cup and having electrical heating rods.

FIG. 1a illustrates a cross-sectional view of an arrangement according to an example of the disclosure, where the arrangement comprises a first heating arrangement 13 having a number of electrical heating rods 13a, such as four heating rods, placed substantially inside the housing wall 8' of the evacuation cup 8. The heating rods 13a are positioned such that they extend substantially perpendicular to the first plane land 11a. The heating rods 13a are distributed along the perimeter of the first cavity 9a such that the first cavity 9a is heated from several portions of the housing wall 8', and substantially provides a uniform heating of the interior of the first cavity 9a. As shown in FIG. 1a the heating rods 13a are placed outside the first cavity 9a and they are not directly exposed to the interior of the first cavity 9a. Possible outgassing from the present first heat arrangement 13 during heating thereof is thereby prevented from reaching the first cavity 9a and through that the void 3, which reduces the risk of contamination of the void 3. In one aspect, the heating rods 13a may be entirely embedded in the housing wall 8'. Heating of soldering frit material 7 placed around the evacuation hole 4 can be obtained using the first heating arrangement 13 which provides substantially uniform heating about an axis extending outward from the evacuation hole 4.

Figure 1B:
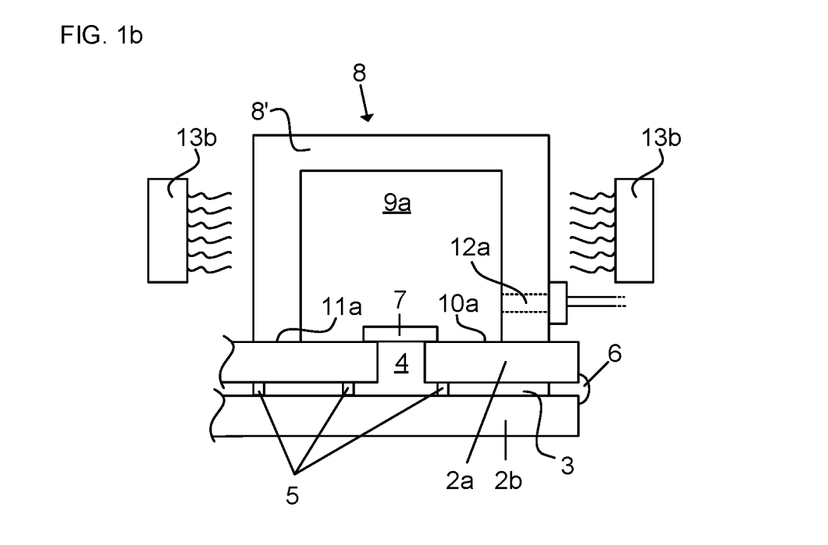
FIG. 1b shows a cross-sectional view of an evacuation cup placed on a part of a VIG unit where the evacuation cup comprises a first heating arrangement situated outside the evacuation cup and comprising radiation sources.

FIG. 1b shows an arrangement having a first heating arrangement 13 placed outside of the first cavity 9a of the evacuation cup 8, outside the housing walls 8' of the evacuation cup 8 and externally to the evacuation cup 8 itself. The first heating arrangement 13 of this example comprises one or more radiation sources 13b which transfer heat to the housing wall 8' by means of radiation. The housing wall 8' is irradiated by suitable electromagnetic radiation, such as laser, microwave or IR radiation. The first heating arrangement 13 may comprise a single element 13b arranged such that it extends around the first cavity 9a and uniformly heats the first cavity 9a via the housing wall 8' around an axis extending outward from the evacuation hole 4. The heat generated in the housing wall 8' is preferably distributed within the housing wall 8' such that a substantially uniform heating of the soldering frit material 7 is obtained. In an aspect of the present example the housing wall 8' of the evacuation cup 8 is made of a highly conductive material such as metal, preferably stainless steel. In the present example as shown in FIG. 1b, the radiation sources 13b are distributed evenly around the first cavity 9a, preferably in a symmetric pattern about an axis extending outward from the evacuation hole. In an aspect there may be four radiation sources 13b distributed evenly around the first cavity 9a.

Figure 1C:
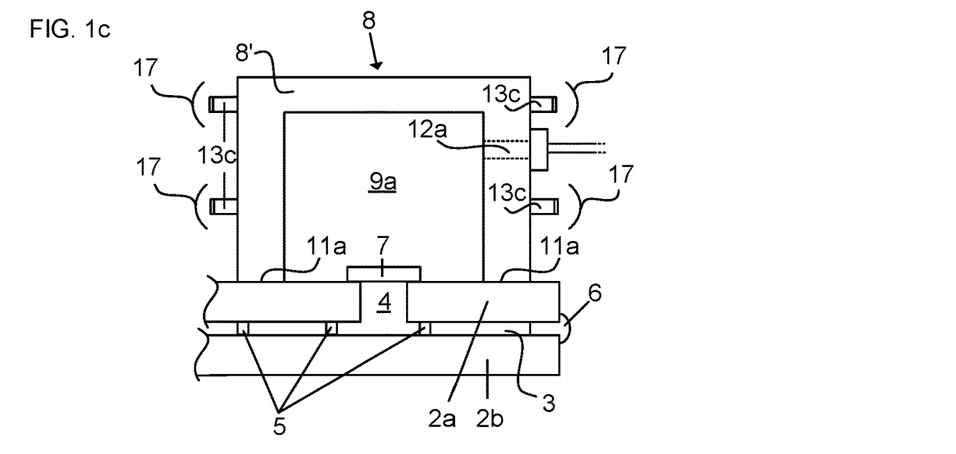
FIG. 1c shows a cross-sectional view of an evacuation cup placed on a part of a VIG unit where the evacuation cup comprises a first heating arrangement situated on the outside of the evacuation cup and having electrical resistor heaters.

In FIG. 1c the first heating arrangement 13 comprises multiple heating elements 13c mounted on the evacuation cup 8 and placed near the outside surface of the housing wall 8' of the evacuation cup 8. The heating elements are in the present example electrical resistor heaters 13c. In the present example, a thermal shield 17 is placed next to each resistor heater 13c, such that it reflects the thermal radiation generated by the electrical resistors 13c towards the housing wall 8' and so that the heat is confined to the nearby surroundings of the housing wall 8'. The electrical resistor heaters 13c are preferably placed distributed evenly around the housing wall 8', in order to provide a uniform heating of the first cavity 9a. The heaters 13c may be ring-shaped and enclosing the evacuation cup, such that the housing wall 8' and the ring-shaped resistor heaters are concentric. Accordingly, the thermal shield 17 may also be ring-shaped and concentric with the housing wall 8'. In the present example, the electrical resistor heaters 13c are placed directly in connection with the outside surface of the evacuation cup 8, but they could alternatively be arranged at a distance from the housing wall 8' and solely heat the housing wall 8' by means of infrared (IR) radiation.

Figure 1D:
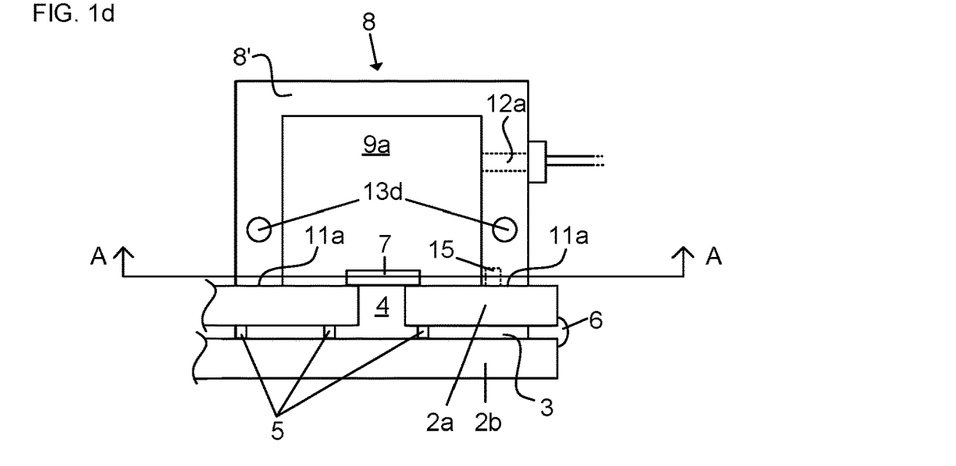
FIG. 1d shows a cross-sectional view of an evacuation cup placed on a part of a VIG unit where the evacuation cup comprises a first heating arrangement situated inside the housing wall of the evacuation cup and having a ring-shaped electrical heating element.
Figure 1E:
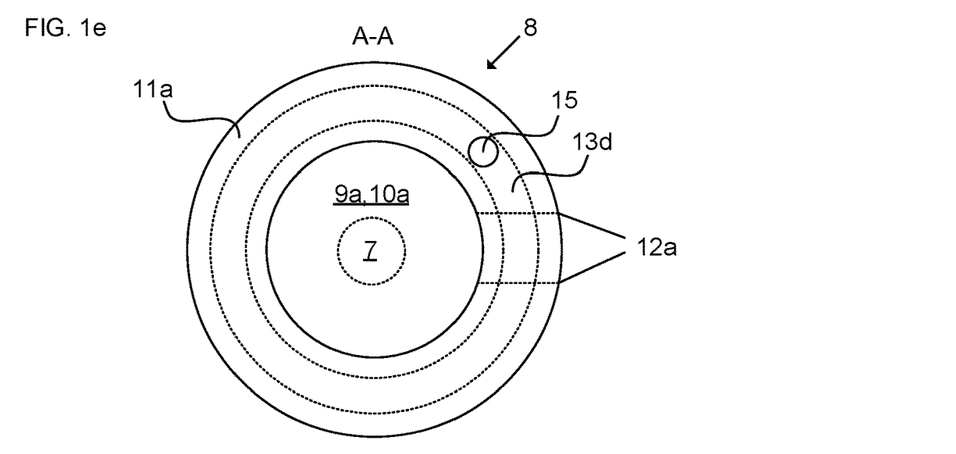
FIG. 1e shows a cross-sectional view of the evacuation cup as shown in FIG. 1d at A-A cutting plane as indicated.

FIG. 1d shows an arrangement having a first heating arrangement 13 comprising an electrical heating element 13d shaped as a ring, which is embedded in the housing wall 8' of the evacuation cup 8 and surrounds the first cavity 9a. The extend of the ring-shaped heating element 13d can be seen in FIG. 1e which illustrates a cross-section of the evacuation cup 8 cut along the line A-A as indicated in FIG. 1d. In FIG. 1e an opening for placement of the temperature sensor 15 is also indicated as well as the first conduit 12a. The ring-shaped heating element 13d is in the present example positioned such that it extends parallel to the first opening 10a of the evacuation cup 8 and thereby can provide heating of the first cavity 9a which is symmetric and uniform about an axis extending outward from the evacuation hole 4. In the present example the ring shaped heating element 13d is configured for heating the soldering frit material 7 via heating of the housing wall 8'. In one aspect of the present disclosure, the housing wall 8' contribute to distributing the heat generated by the ring-shaped heating element 13d such that a large area of the first cavity 9a is affected by the heat generated by the ring-shaped heating element 13d. The ring-shaped heating element 13d is preferably positioned at a specific height within the housing wall 8' at which height, the heat generated by the ring-shaped heat element 13d is most efficiently transferred to the soldering frit material 7 and to the first glass pane 2a covered by the evacuation cup 8.

The evacuation cup 8 may comprise more than one cavity. In FIGS. 2a, 2c, 3b, 3c, 4a and 4b a second cavity 9b is shown in the housing wall 8'. The evacuation cup 8 comprises a first plane land 11a enclosing the first opening 10a of the first cavity 9a and a second plane 11b land enclosing the first plane land 11a and the second opening 10b of the second cavity 9b, additionally the first plane land 11a and second plane land 11b are arranged in a concentric configuration. The evacuation cup 8 is arranged on a VIG unit 1 such that the first plane land 11a and the second plane land 11b are in abutment with the outer surface of the first glass pane 2a. A sealing material may be provided between the plane lands 11a, 11b and the glass surface in order to promote a hermetic connection. Between the first plane land 11a and second plane land 11b a second cavity 9b with a second opening 10b is defined. A second conduit 12b is in connection with the second cavity 9b for fluid communication between the second cavity 9b and the outside of the housing wall 8'. The second cavity 9b may have two purposes, a first purpose is to limit the leak from the outside of the housing wall 8' to the first cavity 9a during evacuation of the void 3 and a second purpose is to aid in maintaining the evacuation cup 8 in connection with the VIG unit 1 by creating a low pressure in the second cavity 9b prior to the evacuation of the first cavity 9a. Contaminants etc. which have transferred from the environment under the second plane land 11b to the second cavity 9b may be pumped out of the second cavity 9b through the second conduit 12b prior to reaching the first cavity 9a. In a preferred example, the first cavity 9a and the second cavity 9b are connected to separate pumps 18.

Figure 2A:
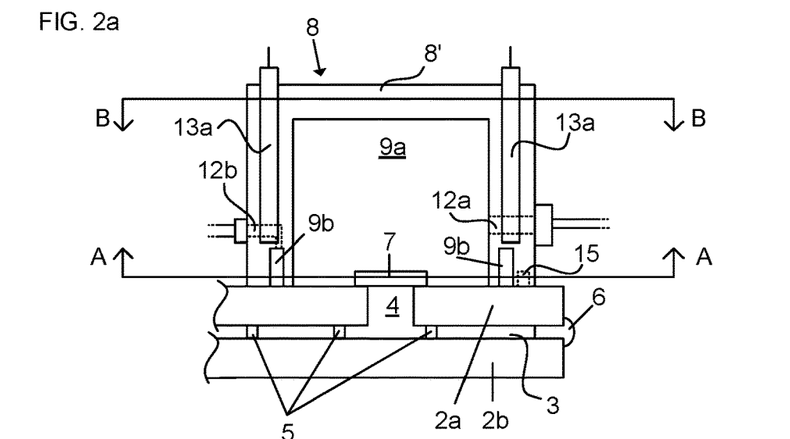
FIG. 2a shows a cross-sectional view of the evacuation cup placed on a part of a VIG unit where the evacuation cup comprises a first cavity and second cavity and a first heating arrangement situated inside the housing wall of the evacuation cup and having electrical heating rods.
Figure 2B:
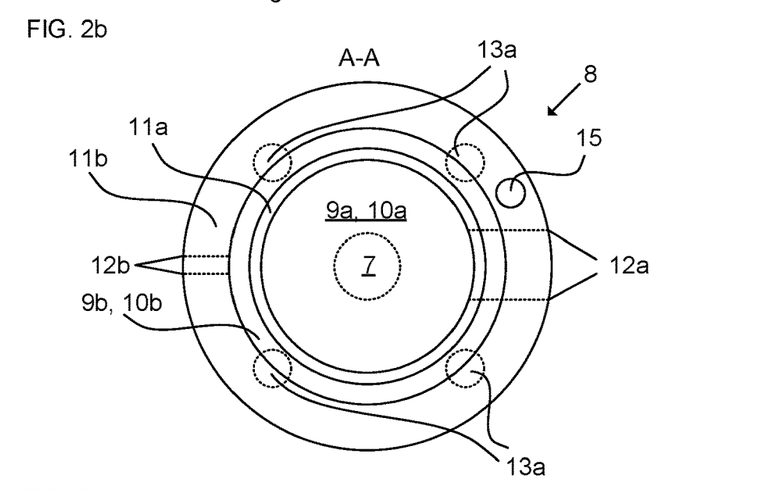
FIG. 2b shows a cross-sectional view of the evacuation cup in FIG. 2a at A-A cutting plane as indicated.
Figure 2C:
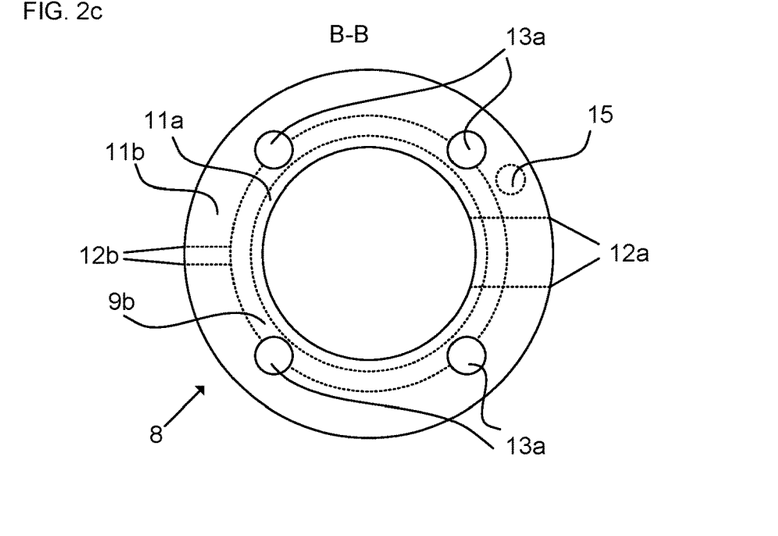
FIG. 2c shows a cross-sectional view of the evacuation cup in FIG. 2a at B-B cutting plane as indicated.

An example of an arrangement according to an example of the disclosure is shown in FIG. 2a. The arrangement comprises electrical heating rods 13a, a temperature sensor 15 and a first conduit 12a and a second conduit 12b in fluid connection with a first cavity 9a and a second cavity 9b. The second cavity 9b is preferably an annular cavity as illustrated in the cross section of evacuation cup 8 shown in FIG. 2b; the cross-section is generated from the A-A cutting plane indicated in FIG. 2a. In FIG. 2b four electrical heating rods 13a are arranged symmetrically about an axis extending outward from the evacuation hole 4. The evacuation cup 8 comprises heat transfer capabilities sufficient for distributing the heat generated from the electrical heating rods 13a in the housing wall 8' such that temperature of the housing wall 8' becomes more uniform around the perimeter of the first cavity 9a. FIG. 2c shows a cross section of evacuation cup 8 shown in FIG. 2b, the cross-section is generated from the B-B cutting plane indicated in FIG. 2a. The cross-section illustrates the circular shape of the evacuation cup 8. Furthermore, the housing wall 8' is shown extending across the first cavity 9a and second cavity 9b and enclosing these.

Additionally or alternatively, the evacuation cup 8 may comprise the first heating arrangement 13 and also a second heating arrangement 19. As shown in FIGS. 3a, 3b, 3c, 4a and 4b the arrangement comprises a first heating arrangement 13 and a second heating arrangement 19 and the VIG unit 1 is arranged with a glass tube 14 placed in the evacuation hole 4, through which tube 14 the void 3 can be evacuated. In the present examples, the frit soldering material 7 is arranged around the tube 14 and is heat-treated using the first heating arrangement 13 in order to create a hermetic seal between the tube 14 and the first glass pane 2a. In an aspect of the present example, the seal is preferably obtained prior to evacuation of the void 3 such that gas is evacuated through the tube 14 only. After the evacuation of the void 3 has been executed the tube 14 is sealed by heating the tip of the tube 14, thereby fully enclosing the void 3. The tube 14 is in the present examples sealed by heat provided by the second heating arrangement 19.

Figure 3A:
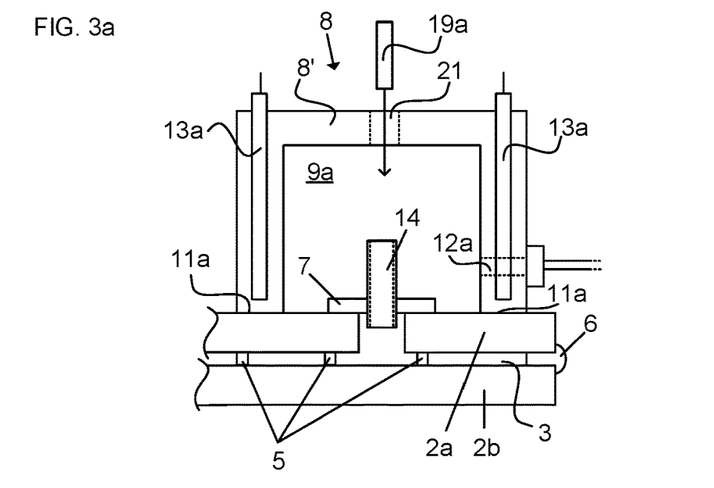
FIG. 3a shows a cross-sectional view of the evacuation cup placed on a part of a VIG unit where the evacuation cup comprises a first and second heating arrangement, where the first heating arrangement comprises electrical heating rods situated inside the housing wall of the evacuation cup while the second heating arrangement comprises a radiation source situated outside the evacuation cup.

In FIG. 3a, the soldering frit material 7 is heated using electrical heating rods 13a embedded in the housing wall 8' and the tip of the tube 14 is heated using a second heating arrangement 19 comprising a radiation source 19a providing thermal radiation to the tube 14. The tube 14 is irradiated by suitable electromagnetic radiation, such as laser, microwave or IR radiation for a sufficient amount of time for melting the tip of the tube 14 and seal it such that no gas can transfer between the void 3 and the outside of the VIG unit 1. In the present example, the radiation source is located outside the evacuation cup 8, and may not be in connection with the evacuation cup 8. A window 21 is provided in the housing wall 8' of the evacuation cup 8, which allows the radiation to be transmitted to the tip of the tube 14.

Figure 3B:
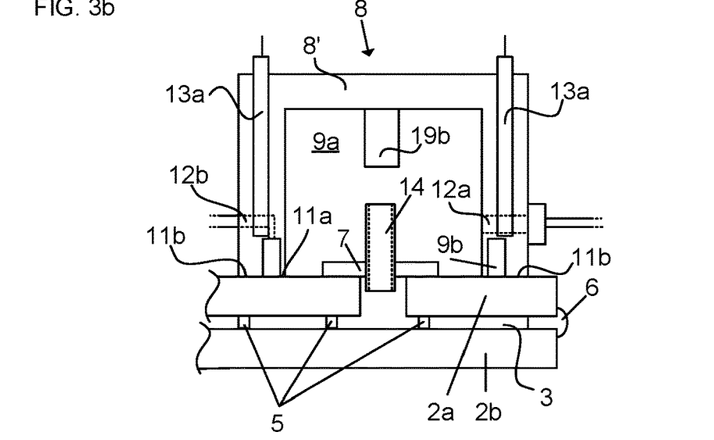
FIG. 3b shows a cross-sectional view of the evacuation cup placed on a part of a VIG unit where the evacuation cup comprises a first and second cavity and a first and second heating arrangement, where the first heating arrangement comprises electrical heating rods situated inside the housing wall of the evacuation cup and the second heating arrangement comprises a heat element situated inside the first cavity on the inside surface of the housing wall.
Figure 3C:
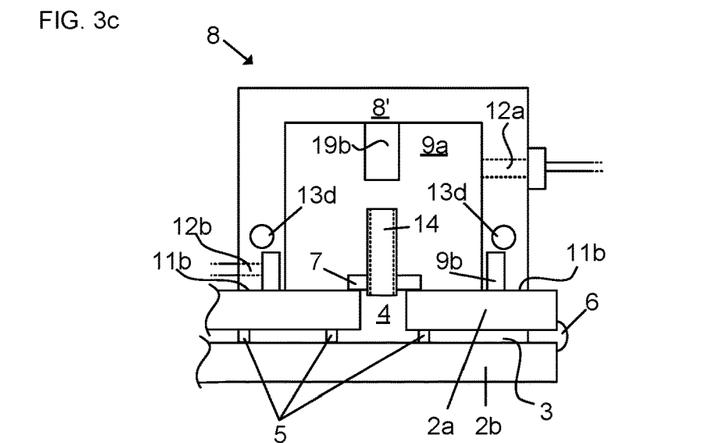
FIG. 3c shows a cross-sectional view of the evacuation cup placed on a part of a VIG unit where the evacuation cup comprises a first and second heating arrangement, where the first heating arrangement comprises a ring-shaped electrical heating element situated inside the housing wall of the evacuation cup and the second heating arrangement comprises a heat element situated inside the first cavity.

FIG. 3*b* shows an arrangement having a second heating arrangement 19 comprising a heating element 19*b* positioned inside the first cavity 9*a*. In the present example the second heating arrangement 19 is placed in connection with housing wall 8' at a position above the tip of the tube 14. The second heating arrangement 19 may comprise a heat element 19*b* suitable for heating the tip of the tube 14 to approximately 900-1200 degrees Celsius, such as a tungsten coil or a ceramic heating element. In one or more examples, the second heating arrangement 19 is configured to provide sufficient heating for the tip of the tube 14 at pressures from atmospheric to vacuum pressure. A similar example to the arrangement shown in FIG. 3*b* is shown in FIG. 3*c*. Here the evacuation cup 8 comprises a first heating arrangement 13 having a ring-shaped electrical heating element 13*d* instead of heating rods 13*a*. In the present example, the ring-shaped electrical heating element 13*d* is positioned inside the housing wall 8' and above the second cavity 9*b*, but in one or more examples the second cavity 9*b* can also be at a position within the housing wall 8' which is closer to the outside surface of the housing wall 8', i.e. towards the outside of the evacuation cup 8, whereby the ring-shaped heat element 13*d* may be placed closer to the inside surface of the housing wall 8' towards the first cavity 9*a*. Additionally or alternatively, the ring-shaped heat element 13*d* can be positioned closer to the VIG unit 1 and the first plane land 11*a*.

Figure 4A:
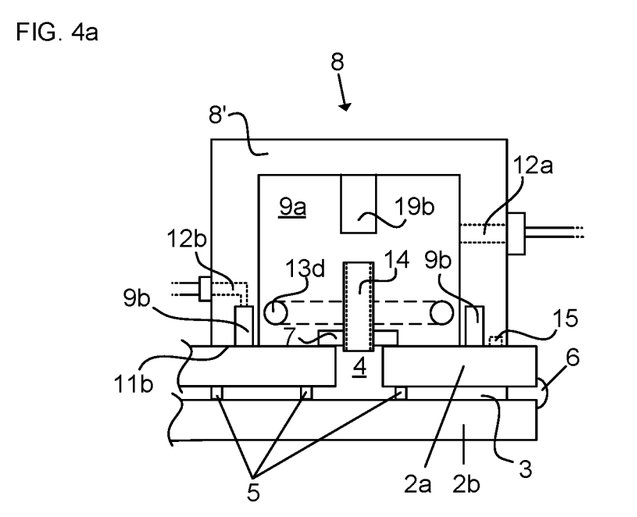
FIG. 4a shows a cross-sectional view of an evacuation cup placed on a part of a VIG unit where the evacuation cup comprises a first and a second cavity and a first and second heating arrangement where the first heating arrangement as well as the second heating arrangement are situated inside the first cavity.
Figure 4B:
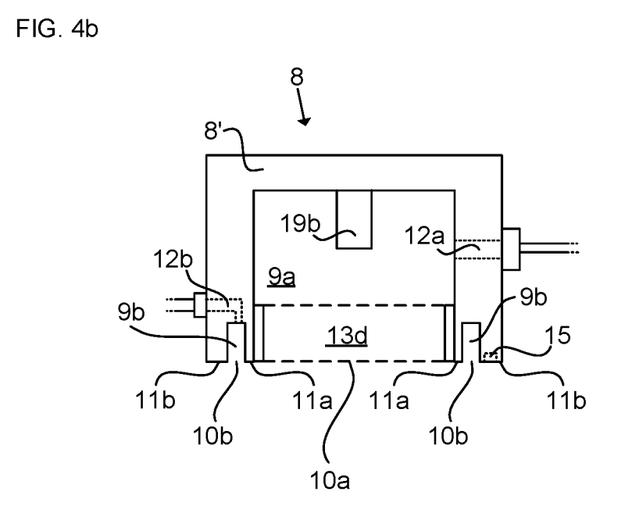
FIG. 4b shows a cross-sectional view of an evacuation cup comprising a first and a second cavity and a first and second heating arrangement situated inside the first cavity. The first heating arrangement is arranged along the perimeter of the first cavity in abutment with the housing wall.

FIG. 4*a* and FIG. 4*b* show two examples of an arrangement where both the first heating arrangement 13 and the second heating arrangement 19 are positioned inside the first cavity 9*a*. In both examples, the second heating arrangement 19 may comprise a heat element 19*b* suitable for heating the tip of the tube 14 to approximately 900-1200 degrees Celsius, such as a tungsten coil or a ceramic heating element. In FIG. 4*a*, the first heating arrangement 13 comprises a ring-shaped electrical heating element 13*d*, which may be place in close proximity to the soldering frit material 7 and around the soldering frit material 7 such that a large fraction of the heat generated by the ring-shaped heating element 13*d* is directly absorbed by the soldering frit material 7 and so that the soldering frit material 7 obtains substantially the same amount of thermal energy about an axis extending outward from the evacuation hole 4. The ring-shaped heating element 13*d* has an extent which is parallel to the first opening 10*a* of the evacuation cup 8. It may be placed in connection with the inside surface of the housing wall 8' or the first glass pane 2*a*.

In FIG. 4*b*, the first heating arrangement 13 comprises a ring-shaped electrical heating element 13*d* of slightly different shape and position as the rings-shaped electrical heating element 13*d* shown in FIG. 4*a*. In FIG. 4*d*, the ring-shaped electrical heating element 13*d* is distributed along the perimeter of the first cavity 9*a*, and abutting a part of the inside surface of the housing wall 8'. The ring-shaped heating element 13*d* is in the present example attached to the inside surface of the housing wall 8', at a position such that it surrounds the soldering frit material 7. It may simultaneously heat the housing wall 8' and the soldering frit material 7. The heating of the housing wall 8' may in turn create a source of radiation for irradiating and heating the soldering frit material 7.

In one or more aspect of the present examples, the first heating arrangement 13 is configured to heat the housing wall 8' to a second temperature (T2) which is higher than a first temperature (T1) of the air surrounding the outside of the evacuation cup 8. The housing wall 8' is configured such that an increase in temperature of the housing wall 8' provides an increase in temperature of the elements enclosed by the housing wall 8', such as the air inside the first cavity 9*a*, the soldering frit material 7 and the part of the first glass pane 2*a* covered by the evacuation cup 8. One purpose of the heating of the elements enclosed by the housing wall 8' is to compensate for the shielding effect of the housing wall 8' which causes the temperature of the elements inside the housing wall 8' to be heated with a time delay as compared to the air in the furnace and outside the housing wall 8'. The soldering frit material 7 and the first pane 2*a* inside the first cavity 9*a* are in one preferred embodiment heated to substantially the same temperature as the remaining part of the first glass pane 2*a* by heating the air inside the first cavity 9*a* to substantially the same temperature as the air surrounding the outside of the housing wall 8' of the evacuation cup 8 such that the soldering frit material 7 forms a hermetic seal, which is in a substantially non-flowing state when the evacuation of the void 3 to a vacuum state is to be initiated. In one or more aspects of the present examples of the disclosure, the VIG unit 1 may be produced inside a furnace 20. The air surrounding the outside of the evacuation cup 8 may be heated to the first temperature (T1) by a furnace 20 and the first temperature (T1) may be utilized to soften soldering frit material between and around the periphery of the glass panes such that a side seal 6 is formed. Furthermore, the first temperature (T1) provided by the furnace 20 is preferably high enough, e.g. least 275 degrees Celsius, in order to efficiently vaporize any contaminants and to provide an optimal thermal cleaning process of the VIG unit 1 during the evacuation of the void 3.

Figure 5:
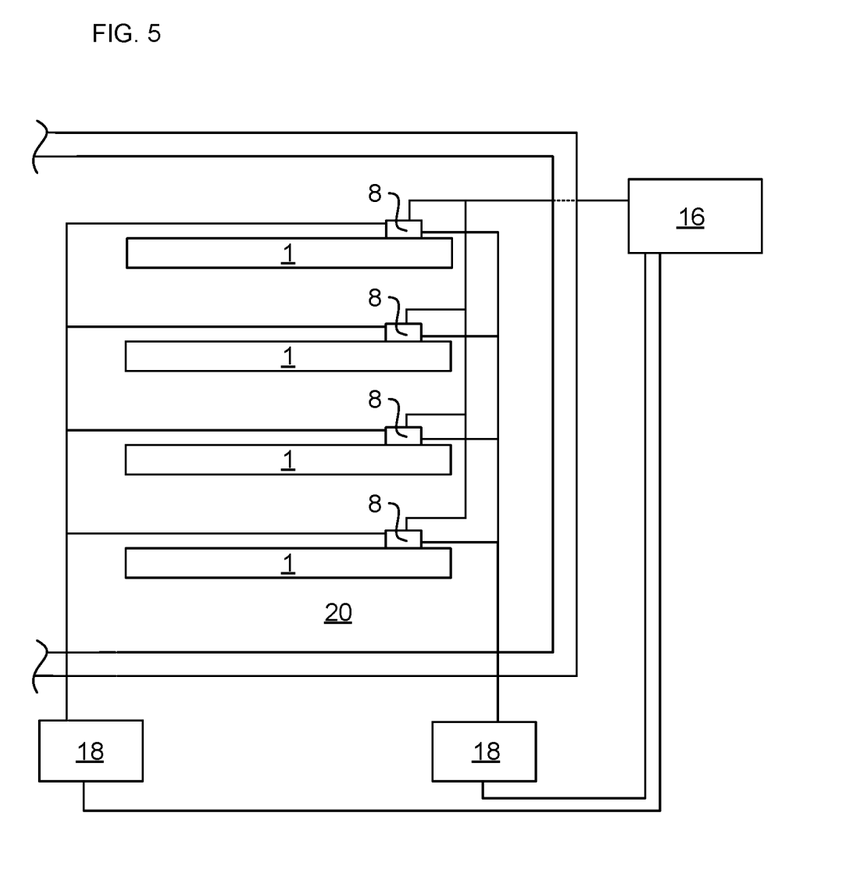
FIG. 5 shows a cross-sectional view of VIG units in a furnace, each VIG unit is arranged with an evacuation cup which is in connection with to a control arrangement and two pumps.

In an aspect of the disclosure, multiple VIG units 1 are produced substantially simultaneously in a furnace 20. As shown in FIG. 5, each VIG unit 1 is arranged with an arrangement according to one or more examples of the disclosure. The arrangements are in fluid connection with one or more evacuation pumps 18. The arrangements, and especially the first heating arrangement 13 and possible second heating arrangement 19 and additionally the temperature sensor 15 within the housing wall 8' are in communication with one or more control arrangements 16. The control arrangement 16 may be configured to adjust the temperature of the housing wall 8', such that the temperature of the air within first cavity 9*a* is the same or different from the air surrounding the evacuation cup 8. The temperature sensor 15 is configured to register the temperature in the evacuation cup 8 and to send an output accordingly to the control arrangement 16. The control arrangement 16 is configured to control the first heating arrangement 13 based on the output received from the temperature sensor 15. This feedback system, such as a PID controller system, may be comprised in the control arrangement 16 for automatically controlling the temperatures of the housing wall 8' and indirectly also the first cavity 9*a* and the soldering frit material 7 according to predetermined temperature profiles for the VIG unit production, such as a predetermined temperature profile for producing a hermetic seal from the soldering frit material 7 provided around the evacuation hole 4. The control arrangement 16 may also configured to control the furnace 20 and the pumps 18.

The evacuation cup 8 is placed on the first glass pane 2*a* such that the first plane land 11*a* is in connection with the first glass pane 2a, such that they are in abutment, preferably with a sealing material or gasket provided. If the evacuation cup 8 has a second plane lane 11b, this is also in abutment with the first glass pane 2a, or in connection with the first glass pane 2a via a seal or gasket.

The second temperature (T2) is measured using a temperature sensor 15 which sends an output accordingly to the control arrangement 16 which in turn controls the first heating arrangement 13 based on the output received from the temperature sensor 15. The control of the first heating arrangement 16 may be done automatically based on the output. Also the control arrangement 16 may be configured to control the first heating arrangement 13 such that it follows a predetermined temperature profile. For example, the first heating arrangement 13 may be set to heat the soldering frit material 7 to 350 degrees Celsius for 30 minutes and then thereafter heat to 390 degrees Celsius for 40 minutes. In one or more examples, the soldering frit material 7 may be heated to a temperature which is 20-50 degrees Celsius higher than the temperature at which the soldering frit material 7 will flow. This higher temperature may be a temperature about 420 degrees Celsius. The soldering frit material 7 around the evacuation hole 4 is heat-treated separately from the side seal 6. By optimum placement of the first heating arrangement 13 outside of the first cavity 9a e.g. at an optimum height from the first glass pane 2a, the heat generated can be focused on the soldering frit material 7, such that e.g. the first glass pane 2a covered by the first cavity 9a of the evacuation cup 8 is only minimally affected by heated housing wall 8'.

After heating the soldering frit material 7 to a flowing state and cooling it subsequently, the soldering frit material 7 is in a non-flowing state at which time it is safe to initiate the evacuation of the void 3 without compromising the efficiency of the seal provided by the soldering frit material 7. If the evacuation is initiated too soon, the soldering frit material 7 may become detached from the surfaces. The void 3 is evacuated by a pump 18, via the first conduit 12a and the first cavity 9a. The pressure to be reached inside the void 3 is preferably at least $10^{-3}$ mbar. In one or more examples, a tube 14 is provided in the evacuation hole 4, with the soldering frit material 7 placed between the outside of the tube 14 and the first glass pane 2a such that the void 3 may be evacuated via the tube 14. After evacuation, the evacuation hole 4 is closed by either heating the soldering frit material 7 such that it extends across the evacuation hole 4 or by sealing the tube 14. The second heating arrangement 19 may be moved towards the tube tip to provide a local heating of the tip of the tube 14.

REFERENCES

1 Vacuum insulated glazing unit
2a First glass pane
2b Second glass pane
3 Void
4 Evacuation hole
5 Pillars
6 Side seal
7 Soldering frit material
8 Evacuation cup
8' Housing wall of the evacuation cup
9a First cavity
9b Second cavity
10a First opening of the evacuation cup
10b Second opening of the evacuation cup
11a First plane land
11b Second plane land
12a First conduit
12b Second conduit
13 First heating arrangement
13a Electrical heating rod
13b Infrared radiation source
13c Electrical resistor heater
13d Ring-shaped electrical heating element
14 Glass tube
15 Temperature sensor
16 Control arrangement
17 Shield
18 Pump
19 Second heating arrangement
19a Radiation source
19b Heat element
20 Furnace
21 Window
T1 First temperature of air surrounding the evacuation cup
T2 Second temperature of the housing wall of the evacuation cup
T3 Temperature of air inside first cavity

The invention claimed is:

1. Method for providing a vacuum to a vacuum insulated glazing (VIG) unit comprising two glass panes which delimit a void therebetween, wherein one of the glass panes includes an evacuation hole therethrough, by means of an evacuation cup comprising a housing wall, a first cavity within the housing wall arranged to be in fluid communication with the evacuation hole of the VIG unit by a first opening of the first cavity, a first plane land enclosing the first opening, a first conduit extending through the housing wall and disposed in fluid communication with the first cavity, and a second plane land enclosing the first plane land and defining a second cavity within the housing wall with a second opening situated between the first plane land and the second plane land, a second conduit connecting the second cavity and an outside of the housing wall, the method comprising:
    arranging the evacuation cup on a first glass pane so that the evacuation hole is in fluid communication with the first cavity by the first opening of the first cavity;
    placing the VIG unit in a furnace;
    heating air of an interior of the furnace with the VIG unit to a first temperature;
    heating the housing wall of the evacuation cup to a second temperature by a first heating arrangement placed outside the first cavity of the evacuation cup while the air temperature of the furnace is at said first temperature, the second temperature being at least 5° C. higher than the first temperature;
    evacuating the void by pumping out the first cavity of the evacuation cup through the first conduit;
    pumping out the second cavity through the second conduit;
    wherein the heating of the housing wall to the second temperature provides convection heating of a soldering material within the first cavity;
    wherein the soldering material is arranged inside or covered by the first cavity; and
    wherein the heating of the housing wall provides heating of the soldering material such that the soldering material is heated to a condition where the soldering material, at least one of, flows and forms an air tight seal.

2. The method according to claim 1, further comprising maintaining the air temperature of the furnace at said first temperature while the housing wall is maintained at said second temperature for at least for 5 minutes so as to heat a soldering material surrounding the evacuation hole.

3. The method according to claim 2, wherein the soldering material is heated to a condition where the soldering material flows.

4. The method according to claim 3, wherein the soldering material is heated to a higher temperature than necessary to reach the flowing condition of the soldering material so as to perform a heat treatment of the soldering material.

5. The method according to claim 2, wherein said soldering material comprises a low-melting temperature glass solder frit.

6. The method according to claim 2, wherein the soldering material is heated after the evacuation of the void is conducted to seal off the evacuation hole.

7. The method according to claim 1, wherein the housing wall of the evacuation cup is heated so that a temperature of the first glass pane covered by the first cavity of the evacuation cup is substantially the same as a temperature of the first glass pane that is not covered by the evacuation cup.

8. The method according to claim 1, further comprising heating a distal tip of a tube extending from the evacuation hole by means of a second heating arrangement so as to seal the distal tip, and placing a second heating element inside the first cavity of the evacuation cup.

9. The method according to claim 1, wherein the evacuation cup comprises:
a housing wall,
a first cavity within the housing wall arranged to be in fluid communication with the evacuation hole of the VIG unit by a first opening of the first cavity,
a first plane land enclosing the first opening,
a first conduit extending through the housing wall and disposed in fluid communication with the first cavity, and
a first heating arrangement placed outside of the first cavity of the evacuation cup, the first heating arrangement configured to heat the housing wall distributedly along a perimeter of the first cavity.

10. The method according to claim 1, further comprising placing a soldering material in the evacuation hole prior to evacuation and sealing the soldering material to the evacuation hole prior to evacuation by heating the housing wall to the second temperature.

\* \* \* \* \*